July 17, 1962 M. G. TOWNSLEY 3,044,676
INTERMITTENT FILM FEEDING DEVICE
Filed Dec. 14, 1959 5 Sheets-Sheet 1

INVENTOR.
Malcolm G. Townsley
BY Robert F. Muehle, Jr.
Atty.

July 17, 1962 M. G. TOWNSLEY 3,044,676
INTERMITTENT FILM FEEDING DEVICE
Filed Dec. 14, 1959 5 Sheets-Sheet 3

INVENTOR.
Malcolm G. Townsley
BY
Robert F. Miehle Jr.
Atty.

July 17, 1962  M. G. TOWNSLEY  3,044,676
INTERMITTENT FILM FEEDING DEVICE
Filed Dec. 14, 1959  5 Sheets-Sheet 4

INVENTOR.
Malcolm G. Townsley
BY Robert F. Miehle
Atty.

July 17, 1962

M. G. TOWNSLEY 3,044,676

INTERMITTENT FILM FEEDING DEVICE

Filed Dec. 14, 1959

INVENTOR.
Malcolm G. Townsley
BY
Robert F. Muehl
Atty.

United States Patent Office 3,044,676
Patented July 17, 1962

3,044,676
INTERMITTENT FILM FEEDING DEVICE
Malcolm G. Townsley, Park Ridge, Ill., assignor to Bell & Howell Company, Chicago, Ill., a corporation of Illinois
Filed Dec. 14, 1959, Ser. No. 859,301
6 Claims. (Cl. 226—71)

This invention relates to an intermittent film feeding device, and more particularly to a single cam device for feeding perforated film along an arcuate path.

An object of the invention is to provide a new and improved intermittent film feed having a cycle in which a single cam causes a claw to be pushed into a perforation in a film, the claw to advance the film, be withdrawn from the film, and then swung back to its initial position.

Another object of the invention is to provide a simple, rugged, single cam intermittent film feed of the type in which a claw is positively withdrawn from film at the end of the feed stroke and is held out of contact with the film during its return stroke.

Another object of the invention is to provide an intermittent film feed in which a claw lever is oscillated by a cam back and forth through feed and return strokes and a second lever mounting the claw lever is actuated by the same cam to push the claw lever into feeding engagement at the end of the return stroke and withdraw the claw lever at the end of the feed stroke.

A complete understanding of the invention may be obtained from the following detailed description of an intermittent film feed forming a specific embodiment thereof, when read in conjunction with the appended drawings, in which.

The invention provides an intermittent film feed in which a claw lever is mounted pivotally on a second lever pivotal on a fixed axis and a single cam, which engages followers on the levers, sequentially actuates the second lever to move the claw lever into a film path, actuates the claw lever in a feed stroke, actuates the second lever to withdraw the claw lever from the film path, and then actuates the claw lever in a return stroke. Preferably the cam has a high arcuate dwell of ninety degrees and a low arcuate dwell of ninety degrees opposite to the high dwell, and followers are provided on the levers for engaging the cam at points about ninety degrees apart.

Figure 1:
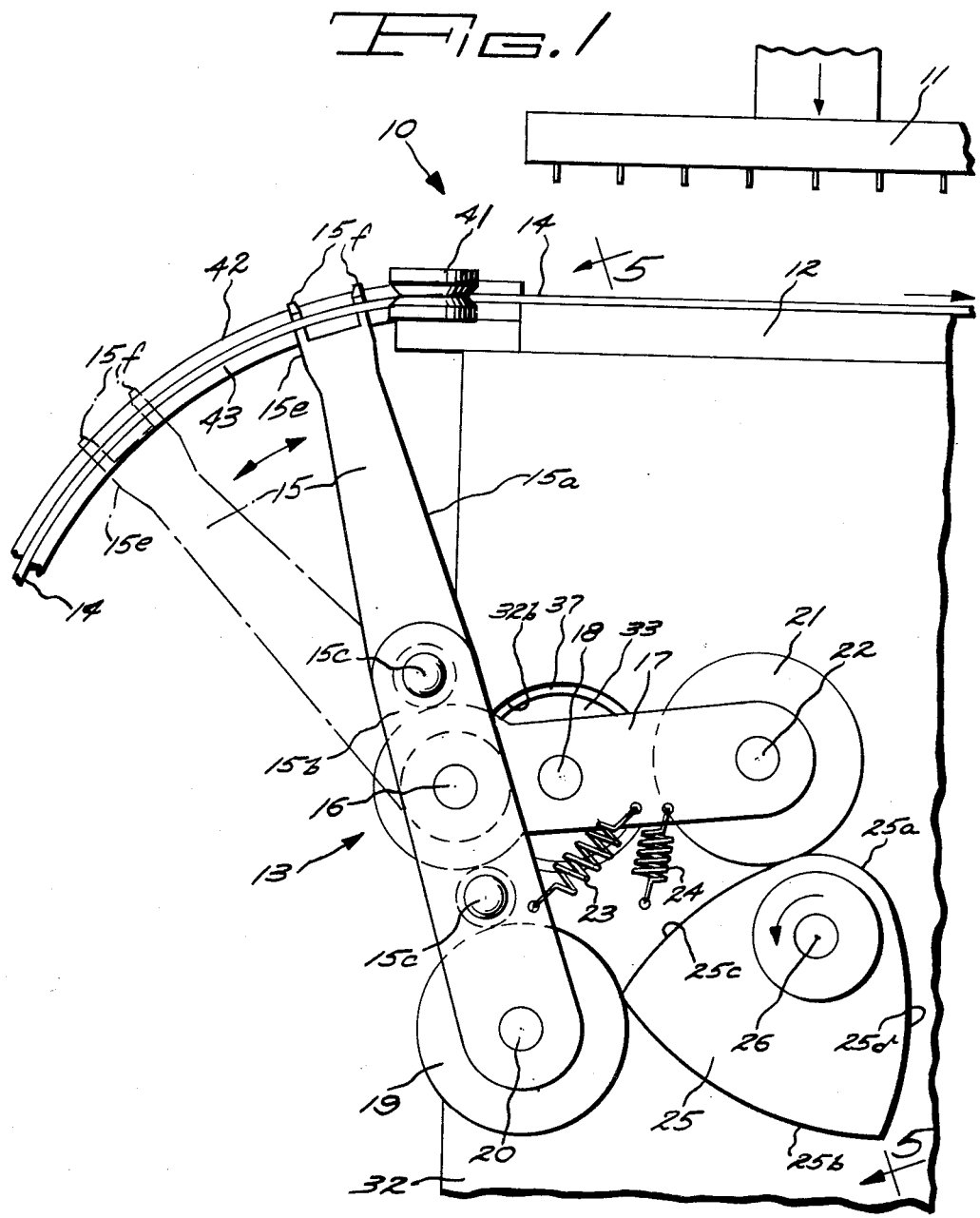
FIG. 1 is a fragmentary front elevation view of an intermittent film feed forming one embodiment of the invention together with a film perforating device and at the start of the feed stroke.

Referring now in detail to the drawings, there is shown in FIG. 1 a press type of film perforator 10 which includes an upper platen 11 and a lower platen 12, both of a known type. The upper platen reciprocates toward and away from the lower platen, and while the upper platen is away from the lower platen an intermittent film feed 13 driven in synchronism with the perforator advances perforated portion of motion picture film 14 from the perforator toward a known take-up (not shown) and pulls an unperforated portion of the film into the perforator. The intermittent feed includes a claw lever 15 mounted by a pin 16 pivotally on a second lever 17 pivotally mounted on a fixed axis by pin 18. The claw lever 15 carries a cam follower roller 19 on a pin 20, and the lever 17 carries a cam follower roller 21 on a pin 22. The rollers 19 and 21 preferably are mounted on the pins 20 and 22 by ball bearings (not shown) as is well known in the art. The levers 15 and 17 are biased by tension springs 23 and 24 against the periphery of cam 25 at points on the cam ninety degrees apart. The cam is keyed to a shaft 26 forming a power take-off of the perforator and driven in synchronism with the reciprocation of the platen, one revolution of the shaft being effected for each reciprocation of the platen. The periphery of the cam 25 has a low arcuate dwell portion 25a of ninety degrees, and a high arcuate dwell portion 25b of ninety degrees and positioned opposite to the portion 25a and having a greater radius than that of the portion 25a. Blending or lobe portions 25c and 25d, each of ninety degrees, connect the ends of the dwell portions 25a and 25b.

Figure 5:
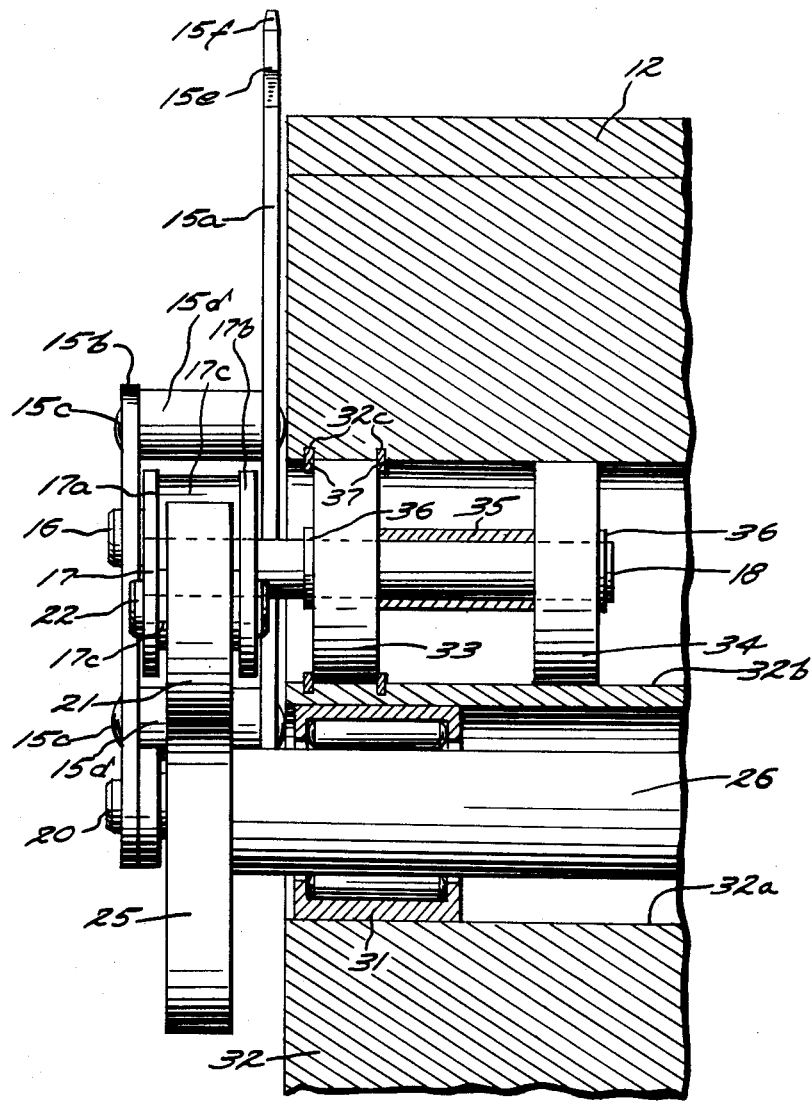
FIG. 5 is a generally vertical sectional view taken along line 5—5 of FIG. 1.

The shaft 26 is mounted rotatably in needle bearing 31 (FIG. 5) in a bore 32a frame 32 of the perforator and a thrust bearing (not shown) and is parallel to the pin 18 and extends to the drive of the perforator. The pin 18 is mounted rotatably and against thrust by ball bearings 33 and 34 in bore 32b in the frame 32. The bearings 33 and 34 are held apart by thrust sleeve 35 and are prevented from separating by snap rings 36 locked to the pin 18. C-rings 37 bracketing the bearing 33 fit into grooves 32c to hold the bearing 33 against movement along the bore 32b.

The lever 17 comprises rigid plate-like members 17a and 17b secured into a rigid frame by the pins 16, 18 and 22 and spacer sleeves 17c between the members. The lever 15 includes an elongated, rigid, plate-like member 15a and a shorter, rigid plate-like member 15b secured to the member 15a and forming a rigid, frame-like, element therewith by rivets 15c and spacer sleeves 15d. The member 15a has a claw 15e (FIG. 1) formed on the upper end thereof and including teeth or claws 15f which have tapered ends and are adapted to enter adjacent perforations in the film 14 and are spaced apart the distance between the adjacent perforations.

The film 14 travels from between the platens 11 and 12, through edge guides 41, which may be peripherally grooved rollers, and along an arcuate path defined by longitudinally split concentric arcuate guides 42 and 43. The pins or teeth 15f of the claw 15e are adapted to project through and travel along the slits in the guides 42 and 43.

Figure 2:
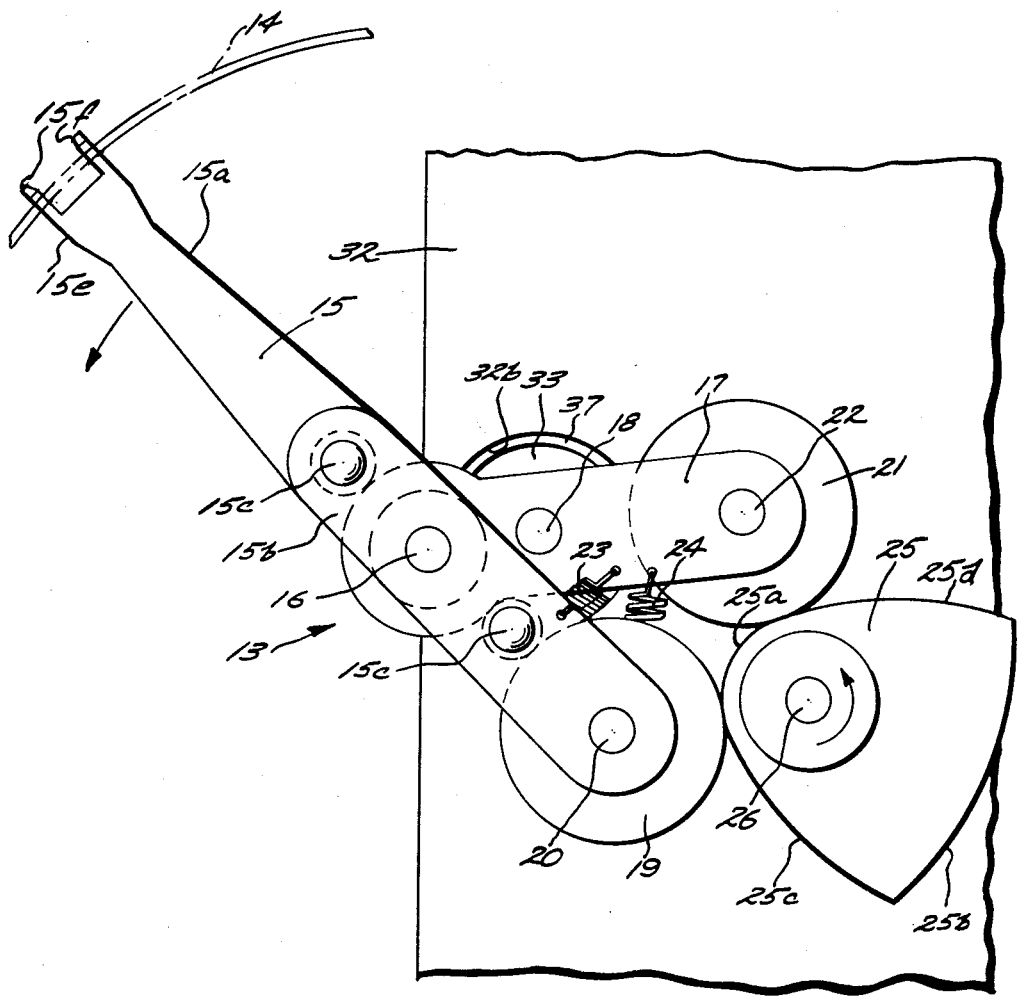
FIGS. 2, 3 and 4 are views similar to FIG. 1 during different stages in a cycle of the intermittent film feed.
Figure 3:
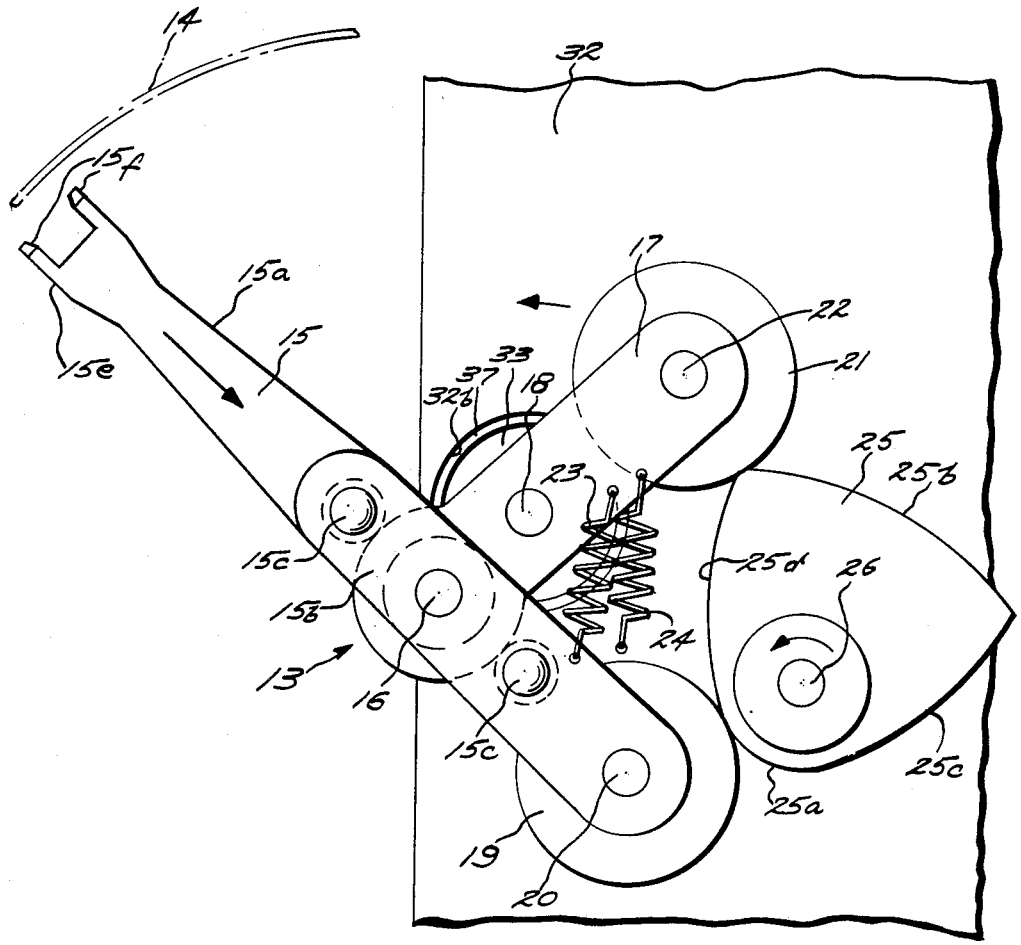
Figure 4:
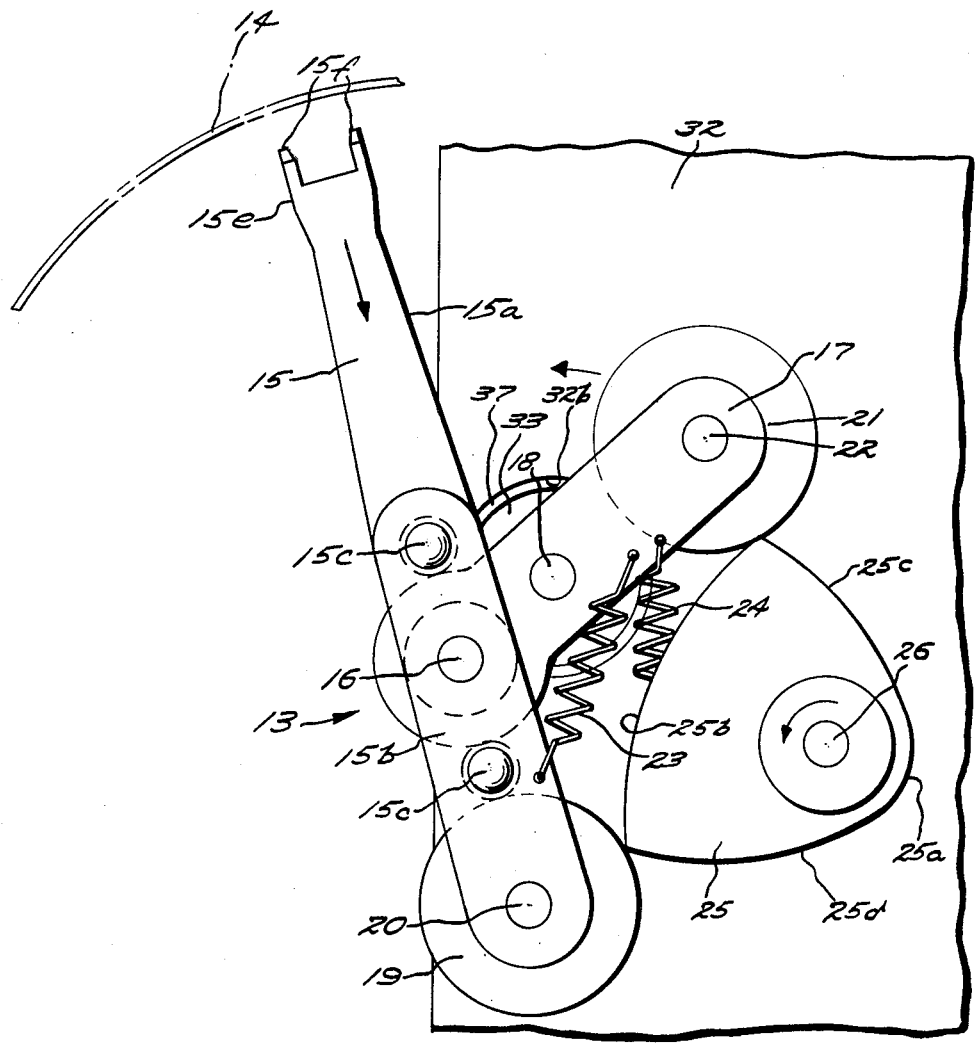

In the operation, the perforating platens 11 and 12 open and close to perforate the film, and, during a part of each open portion of each cycle, the cam 25 rotates ninety degrees from the position thereof shown in FIG. 1 to that shown in FIG. 2. As the cam so turns, the follower roller 21 engages only the low dwell 25a so that the lever 17 is stationary and the follower roller 19 is engaged by the blending portion 25c and the claw lever is swung in a feed stroke counter-clockwise about the temporarily stationary pin 16 to advance the film along the guides 42 and 43 and pull unperforated film into the perforator. The guides 42 and 43 are centered on the pin 16 while it is in this position. At the end of the feed stroke of the claw lever as shown in FIG. 2, the roller 19 is engaged by the forward end of the low dwell portion 25a of the cam 25 and the roller 21 is engaged by the forward end of the blending portion 25d of the cam. A claw retracting movement then is started, the roller 19 relatively traveling along the dwell 25a so that the lever 15 is not turned on the pin 16 and roller 21 relatively traveling from the low dwell 25a to the high dwell 25b. This swings the lever 17 from its position of FIG. 2 to the position thereof of FIG. 3 to pull the claw lever 15 out of the perforations in the film. The radius of the low dwell is substantially equal to the distance between centers of the pins 16 and 18 and the swinging of the pin 16 has a negligible component of movement which would pivot the claw lever 15 on the pin 16 during the retraction of the lever 15 from the film. During the next ninety degrees of rotation of the cam 25, the lever 17 is on the high dwell 25b and is stationary while the lever 15 is swung by the portion 25d of the cam to the position thereof shown in FIG. 4, the claws or teeth 15f being retracted from the film throughout this return stroke. Then, during the last ninety degree rotation of the cam of its cycle, the high dwell 25b engages the roller 19 and the portion 25c of the cam engages the follower roller 21 and permits the spring to swing the lever 17 clockwise, as viewed in FIG. 4. This pushes the claw lever 15 longitudinally from its retracted position shown in FIG. 4 to its inserted or film engaging position shown in FIG. 1. During this cycle of operation of the intermittent film feeding device the platens 11 and 12 are open so as to free the film during the feed stroke and are closed only during the remainder of the cycle to perforate the film.

The above intermittent film feeding device is simple in its construction, only a single cam being required, while being positive in the operation thereof. The claw is positively inserted and retracted relative to the film.

While the invention is thus described, it is not wished to be limited to the precise details described, as changes may be readily made without departing from the spirit of the invention.

What is claimed is:

1. In an intermittent film feeding device, a cam having a single peripheral cam surface, the cam surface having a low dwell of ninety degrees and also having a high dwell of ninety degrees spaced oppositely from the low dwell, a claw lever having a claw at one end and a follower at the other end engaging the cam surface and being pivoted in feed and return strokes when engaged by the portions of the cam surface between the dwells, and a second lever mounted pivotally and mounting the claw lever pivotally thereon, the second lever having a follower engaging the cam surface at a point about ninety degrees from the point of engagement of the follower of the claw lever and the cam surface and serving to move the claw lever into and out of engagement with film to be advanced.

2. In an intermittent film feed, a cam having a single peripheral surface rotated continuously in one direction on a first axis and having a peripheral low dwell arcuate relative to said axis and extending substantially ninety degrees around said axis, the cam also having a peripheral high dwell arcuate relative to said axis and extending substantially ninety degrees around said axis, the ends of each dwell being spaced substantially ninety degrees from the ends of the other dwell, the cam also having peripheral portions interconnecting the dwells, said portions blending smoothly with the low dwell while meeting the high dwell abruptly, a first lever mounted pivotally intermediate its ends on a fixed axis spaced laterally from and parallel with the first axis and having at one end thereof a cam follower engaging the cam, and a claw lever mounted at a point intermediate its ends pivotally on the other end of the first lever and having a claw at one end thereof and a cam follower at the other end thereof engaging the cam at a point thereon approximately ninety degrees from the follower of the first lever, whereby, as the cam is rotated, the tooth successively is moved into a perforation in a film, moves the film along a path in one direction, is retracted from the perforation and is swung back in the other direction.

3. In an intermittent film feed, an arcuate film guide, a first lever pivoted about a first axis intermediate the ends thereof and having a follower at one end thereof, a cam rotated on a second axis parallel with the first axis and having an arcuate peripheral low dwell portion of a predetermined radius centered on the second axis and extending substantially ninety degrees therearound and also having an arcuate peripheral high dwell spaced ninety degrees from the low dwell and of a radius substantially greater than that of the low dwell, the high dwell extending substantially ninety degrees around the cam, the follower being urged into contact with the periphery of the cam, and a claw lever pivotally mounted intermediate its ends to the other end of the first lever about a third axis parallel with the first axis, said claw lever having a claw at one end thereof for engaging film in the guide and a follower at the other end thereof engaging the periphery of the cam at a point thereof substantially ninety degrees from the point on the cam engaging the follower of the first lever, the cam and the first lever being so positioned relative to one another that the third axis is at the center of curvature of the arcuate guide when the follower of the first lever is in engagement with the low dwell of the cam whereby said claw will move in an arcuate path while in engagement with film in said arcuate guide.

4. In an intermittent film feed, a first lever pivoted about a first axis intermediate the ends thereof having a follower at one end thereof, a cam having a single peripheral surface rotated on a second axis parallel with the first axis and having an arcuate peripheral low dwell portion of a predetermined radius centered on the second axis and extending substantially ninety degrees therearound and also having an arcuate peripheral high dwell spaced ninety degrees from the low dwell and of a radius substantially greater than that of the low dwell, the high dwell extending substantially ninety degrees around the cam, said cam further having portions intermediate said low and high dwells which blend smoothly with the low dwell while meeting the high dwell abruptly, the follower being urged into contact with the periphery of the cam, and a claw lever pivotally mounted intermediate its ends to the other end of the first lever about a third axis parallel with the first axis and having a claw at one end thereof for engaging film and a follower at the other end thereof engaging the periphery of the cam at a point thereof substantially ninety degrees from the point on the cam engaging the follower of the first lever.

5. In an intermittent film feed, a feeding lever having film-engaging means at one end and a cam follower at the other end thereof, a second lever having a cam follower at one end and carrying pivotally on the other end thereof the feeding lever for pushing the film-engaging means into engagement with a perforated portion of a film guided along a predetermined path at the start of a feed stroke thereof, and for withdrawing the film-engaging means from the perforated portion of the film at the end of the feed stroke, and a single peripheral surface cam having a peripheral low dwell of ninety degrees and a peripheral high dwell of ninety degrees spaced opposite to the low dwell, the cam follower engaging the cam continuously and engaging the low dwell during the feed stroke and engaging the high dwell during the return stroke of the feeding lever, the cam follower of the feeding lever urged into engagement with the cam at a point on the cam about ninety degrees from the point at which the follower of the second lever engages the cam so that the feeding lever is swung in its feed stroke by the cam as the cam moves the high dwell away from the follower of the feeding lever and the low dwell to the feeding lever follower and is swung in its return stroke as the cam moves the low dwell away from the follower of the feeding lever and the high dwell to the feeding lever follower.

6. In an intermittent film feed, a claw lever having a claw tooth at one end and a cam follower at the other end thereof, a second lever having a cam follower at one end and carrying pivotally on one end thereof the claw lever for pushing the claw tooth into a perforation in a film guided along a predetermined path at the start of a feed stroke thereof and for withdrawing the claw tooth from the perforation at the end of the feed stroke, and a single peripheral surface cam having a peripheral low dwell of ninety degrees and a high peripheral dwell of ninety degrees spaced opposite to the low dwell, the cam follower of the second lever engaging the cam continuously and engaging the low dwell during the feed stroke and engaging the high dwell during the return stroke of the claw lever, the claw lever cam follower urged into engagement with the cam at a point on the cam about ninety degrees from the point at which the follower of the second lever engages the cam so that the claw lever is swung in its feed stroke by the cam as the cam moves the high dwell away from the follower of the claw lever and the low dwell to the claw lever follower and is swung in its return stroke as the cam moves the low dwell away from the follower of the claw lever and the high dwell to the claw lever follower.

References Cited in the file of this patent
UNITED STATES PATENTS

| | | |
|---|---|---|
| 2,090,798 | Lingg et al. | Aug. 24, 1937 |
| 2,506,649 | Reeves | May 9, 1950 |
| 2,587,548 | Thevenaz | Feb. 26, 1952 |